United States Patent
Forte

(10) Patent No.: US 10,084,196 B2
(45) Date of Patent: Sep. 25, 2018

(54) SYSTEM AND METHOD FOR CONTROLLING FUEL CELL MODULE

(71) Applicant: HYDROGENICS CORPORATION, Mississauga (CA)

(72) Inventor: Paolo Forte, Maple (CA)

(73) Assignee: Hydrogenics Corporation, Mississauga (CA)

(*) Notice: Subject to any disclaimer, the term of this patent is extended or adjusted under 35 U.S.C. 154(b) by 802 days.

(21) Appl. No.: 14/398,614

(22) PCT Filed: May 3, 2013

(86) PCT No.: PCT/CA2013/050345
§ 371 (c)(1),
(2) Date: Nov. 3, 2014

(87) PCT Pub. No.: WO2013/163765
PCT Pub. Date: Nov. 7, 2013

(65) Prior Publication Data
US 2015/0125766 A1    May 7, 2015

Related U.S. Application Data

(63) Continuation-in-part of application No. 13/874,798, filed on May 1, 2013, now Pat. No. 9,368,814.
(Continued)

(51) Int. Cl.
*H01M 8/04119* (2016.01)
*H01M 8/04858* (2016.01)
(Continued)

(52) U.S. Cl.
CPC ..... *H01M 8/04917* (2013.01); *H01M 8/0485* (2013.01); *H01M 8/04156* (2013.01);
(Continued)

(58) Field of Classification Search
CPC ........ H01M 8/04514; H01M 8/04567; H01M 8/04179; H01M 8/04156
See application file for complete search history.

(56) References Cited

U.S. PATENT DOCUMENTS

| 4,069,371 A | 1/1978 | Zito |
| 6,215,272 B1 | 4/2001 | Ohara et al. |

(Continued)

FOREIGN PATENT DOCUMENTS

| CA | 2741180 | 5/2010 |
| CA | 2792711 | 9/2011 |

(Continued)

OTHER PUBLICATIONS

International Search Report of PCT/CA2013/050345.
(Continued)

*Primary Examiner* — Ula Corinna Ruddock
*Assistant Examiner* — Thomas H Parsons

(57) ABSTRACT

A fuel cell module has a hydrogen recirculation pump and a controller. The controller receives a signal indicating the response of the pump to changes in the density or humidity of gasses in the hydrogen recirculation loop. The controller is programmed to consider the signal in controlling one or more balance of plant elements that effect the removal of water from the stack. In a process for operating the fuel cell module, the signal is considered when controlling one or more balance of plant elements that effect the removal of water from the stack. For example, an increase in current drawn from a constant speed or voltage recirculation pump indicates an increase in humidity and suggests that water should be removed from the stack, for example by increasing a coolant temperature set point.

10 Claims, 2 Drawing Sheets

Related U.S. Application Data

(60) Provisional application No. 61/642,846, filed on May 4, 2012.

(51) Int. Cl.
  *H01M 8/04828* (2016.01)
  *H01M 8/04701* (2016.01)
  *H01M 8/04791* (2016.01)
  *H01M 8/1018* (2016.01)

(52) U.S. Cl.
  CPC ... *H01M 8/04701* (2013.01); *H01M 8/04798* (2013.01); *H01M 8/04835* (2013.01); *H01M 2008/1095* (2013.01)

(56) References Cited

U.S. PATENT DOCUMENTS

| | | | |
|---|---|---|---|
| 6,399,231 | B1 | 6/2002 | Donahue et al. |
| 6,939,633 | B2 | 9/2005 | Goebel |
| 7,291,411 | B2 | 11/2007 | Pettit et al. |
| 7,425,379 | B2 | 9/2008 | Joos |
| 7,465,507 | B2 | 12/2008 | DeVries et al. |
| 7,670,700 | B2 * | 3/2010 | Imamura ............ B60L 11/1881 205/337 |
| 7,862,943 | B2 | 1/2011 | Hortop et al. |
| 8,048,579 | B2 | 11/2011 | Robb |
| 8,283,082 | B2 | 10/2012 | Ojima et al. |
| 8,492,046 | B2 | 7/2013 | Yu et al. |
| 2004/0001980 | A1 | 1/2004 | Balliet et al. |
| 2005/0106424 | A1 | 5/2005 | Elhamid et al. |
| 2005/0186454 | A1 | 8/2005 | Clingerman et al. |
| 2005/0227126 | A1 | 10/2005 | Korytnikov et al. |
| 2006/0083965 | A1 | 4/2006 | Rainville et al. |
| 2006/0093879 | A1 | 5/2006 | Yang et al. |
| 2006/0115700 | A1 | 6/2006 | Kotani et al. |
| 2006/0194087 | A1 | 8/2006 | Park et al. |
| 2006/0238033 | A1 | 10/2006 | Raiser et al. |
| 2008/0038595 | A1 | 2/2008 | Buchi et al. |
| 2008/0145716 | A1 | 6/2008 | Yu et al. |
| 2008/0160370 | A1 | 7/2008 | Masse et al. |
| 2008/0248346 | A1 | 10/2008 | Fujimura et al. |
| 2009/0243390 | A1 | 10/2009 | Oto |
| 2009/0280373 | A1 | 11/2009 | Baaser et al. |
| 2010/0035096 | A1 | 2/2010 | Britz et al. |
| 2010/0239927 | A1 | 9/2010 | Moran et al. |
| 2010/0310955 | A1 | 12/2010 | Yadha et al. |
| 2011/0003222 | A1 | 1/2011 | Margiott et al. |

FOREIGN PATENT DOCUMENTS

| | | | |
|---|---|---|---|
| CN | 101222064 | A | 7/2008 |
| CN | 101911356 | A | 12/2010 |
| JP | 2005302648 | * | 10/2005 |
| JP | 2009123599 | A | 6/2009 |
| KR | 20040005144 | A | 1/2004 |
| KR | 20110058459 | A | 6/2011 |
| WO | 2004114448 | A2 | 12/2004 |
| WO | 2005036683 | A1 | 4/2005 |
| WO | 2007090284 | A1 | 8/2007 |
| WO | 2008027043 | A1 | 3/2008 |
| WO | 2011077229 | A1 | 6/2011 |

OTHER PUBLICATIONS

Chinese Patent Application No. 201380022983, Office Action dated Jan. 20, 2017—With English Translation.
Chinese Patent Application No. 201380022983, Office Action dated May 3, 2016—With English Translation.
European Patent Application No. 13773056, Supplementary European Search Report dated Dec. 9, 2015.
European Patent Application No. 13784496, Supplementary European Search Report dated Dec. 17, 2015.
International Patent Application No. PCT/CA2013/050256, International Preliminary Report on Patentability dated Oct. 16, 2014.
International Patent Application No. PCT/CA2013/050256, International Search Report and Written Opinion dated Jul. 2, 2013.
International Patent Application No. PCT/CA2013/050345, International Preliminary Report on Patentability dated Nov. 13, 2014.
International Patent Application No. PCT/CA2014/050943, International Preliminary Report on Patentability dated Apr. 14, 2016.
International Patent Application No. PCT/CA2014/050943, International Search Report and Written Opinion dated Jan. 16, 2015.
Nishizawa et al., "Fuel Cell and Li-ion Battery Direct Hybridization System for Aircraft Applications", Journal of Power Sources, Jan. 2013, vol. 222, pp. 294-300.
San Martin, et al., "Modelling of PEM Fuel Cell Performance: Steady-State and Dynamic Experimental Validation", Energies, Feb. 2014, vol. 7, pp. 670-700.
U.S. Appl. No. 13/874,798, Notice of Allowance dated Feb. 12, 2016.
U.S. Appl. No. 13/874,798, Office Action dated Jul. 30, 2015.
U.S. Appl. No. 14/389,877, Office Action dated Mar. 14, 2017.
Written Opinion for Application No. PCT/CA2013/050345, dated Jul. 26, 2013, 4 pages.
Page et al., "Testing Procedure for Passive Fuel Cell State of Health," Australasian Universities Power Engineering Conference, Sep. 2004, 6 pages.

* cited by examiner

SYSTEM AND METHOD FOR CONTROLLING FUEL CELL MODULE

RELATED APPLICATIONS

This application is a National Stage Entry of International Application No. PCT/CA2013/050345, filed May 3, 2013, which claims the benefit of U.S. Provisional Application No. 61/642,846 filed May 4, 2012 and U.S. application Ser. No. 13/874,798 filed May 1, 2013 which are hereby incorporated by reference.

FIELD

This specification relates to systems and methods for controlling fuel cell modules.

BACKGROUND

A PEM fuel cell module include a fuel cell stack. The fuel cell stack contains numerous polymer electrolyte membranes that are intended to conduct protons between the electrodes. These membranes are most conductive when the water content of the membranes is within a certain range. The water content of the membranes may increase above this range when too much water, created in the fuel cell or brought in with ambient air or a humidifier, is kept in the stack. The water content of the membranes may fall below the range when too much of the water from these sources is removed. When a cell stack is operated at a generally constant current density, the voltage of the cell stack drops when the water content is outside of the range.

INTRODUCTION TO THE INVENTION

The following introduction is intended to introduce the reader to the detailed description to follow and not to limit or define any claimed invention.

In a process for operating a fuel cell module described in this specification, a signal associated with a hydrogen recirculation pump is considered when controlling one or more balance of plant elements that affect the rate of water removal from the stack. The signal is related to the response of the pump to changes in the density or humidity of gasses in the hydrogen recirculation loop.

A fuel cell module described in this specification has a hydrogen recirculation pump and a controller. The controller receives a signal indicating the response of the pump to changes in the density or humidity of gasses in the hydrogen recirculation loop. The controller is programmed to consider the signal in controlling one or more balance of plant elements that effect the removal of water from the stack.

In an example, hydrogen is circulated by a regenerative or centrifugal pump operating at a generally constant voltage or speed. A signal indicating the current drawn by the pump is sent to a controller. The controller raises a cooling system temperature set point if the current is above a selected value or range. The controller lowers a cooling system temperature set point or range if the current is below the selected value or range. In the cooling system, water passes through the stack and a radiator at a generally constant flow rate. The speed of a radiator fan increases if a measured cooling system temperature is above the temperature set point or range and decreases if the measured temperature is below the set point or range.

Without intending to be limited by theory, membrane water content is related to the humidity in the fuel side of a cell stack. The density of gasses in the fuel side of a stack varies with humidity. Accordingly, when the humidity in the fuel side of a cell stack increases, more energy is required to achieve the same volumetric flow rate in the recirculation loop. A signal related to the recirculation pump, such as the current drawn by a constant speed, constant voltage regenerative pump, therefore indicates the water content of the membranes. This signal can be used to generate an instruction to the balance of plant that will increase or decrease the rate of water removal from the stack. The rate of water removal can be varied, for example, by changing one or more of the hydrogen (anode side) purge rate, air (cathode side) flow rate, and stack or cooling system temperature. Raising the cooling system temperature set point causes air to be exhausted at a higher temperature, and the hotter air removes more water as vapor from the stack.

In a fuel cell module and process described herein, a hydrogen recirculation pump is used as a humidity sensor.

DETAILED DESCRIPTION

Figure 1:
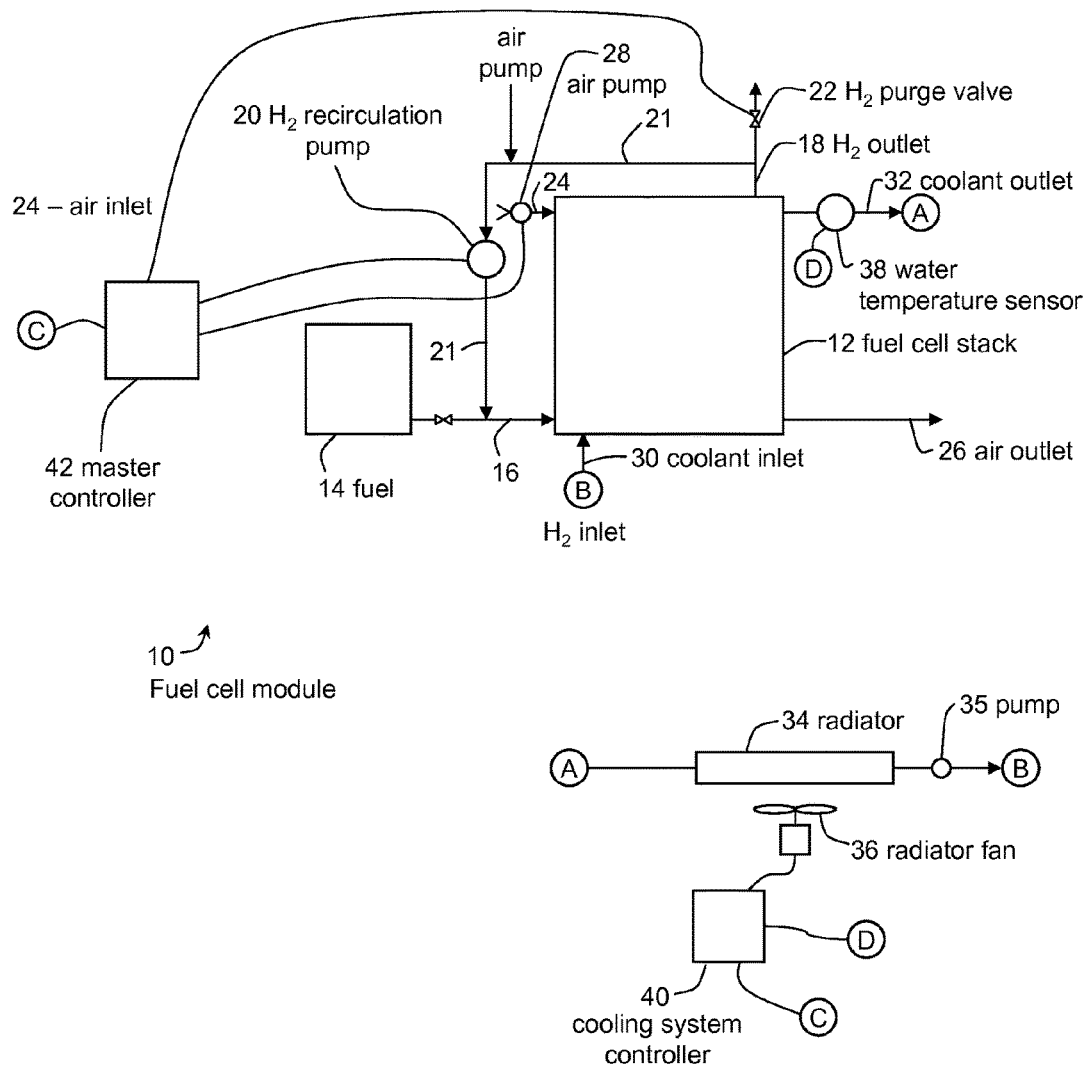
FIG. 1 is a schematic representation of a fuel cell module.

FIG. 1 shows a fuel cell module 10. The fuel module has a fuel cell stack 12 containing a plurality of PEM cells. Flow field plates within the stack 12 define a coolant path, a fuel side path (also called a hydrogen or anode side path) and an air side path (also called an oxygen or cathode side path). Various balance of plant elements are used to manage the flow of materials through these paths. Some examples of these balance of plant elements will be described below as shown in FIG. 1 but other balance of plant elements or configurations may also be used.

Hydrogen, or a fuel containing hydrogen, is released from a fuel source 14, enters the stack 12 at a hydrogen inlet 16 and exits the stack 12 from a hydrogen outlet 18. Un-reacted hydrogen released from the hydrogen outlet 18 travels through a re-circulation loop 21 back to the hydrogen inlet 16. Flow in the re-circulation loop 21 is driven by a hydrogen re-circulation pump 20. From time to time, hydrogen, other impurities and water are removed from the fuel side of the stack by opening a purge valve 22. The purge valve 22 may be a solenoid valve or another type of valve that can be operated by a mechanical, electrical or computerized controller.

Air (or oxygen or oxygen enriched air) flows into the stack 12 through an air inlet 24. Air and water vapor leave the stack 12 through an air outlet 26. The flow of air is driven by an air pump 28. The air pump 28 may operate at a constant speed or be driven by a variable frequency drive or other speed controllable motor. The air pump 28 may be connected to the air inlet 24 or the air outlet 26.

Coolant, such as water or a mixture of water and an alcohol or another anti-freeze agent, enters the stack 12 through a coolant inlet 30 and exits the stack 12 from a coolant outlet 32. From the coolant outlet 32, the coolant passes through a radiator 34 or other hear exchanger before returning to the coolant inlet 30. Coolant moves through this loop, optionally at a generally constant flow rate, driven by pump 35. A coolant temperature sensor 38 sends a signal indicating the coolant or stack 12 temperature to a coolant system controller 40. The coolant temperature sensor 38 can be located in the stack 12 or anywhere in the external part of the coolant loop. The coolant system controller 40 adjusts the speed of a radiator fan 36 as required to keep the temperature near, or within a specified range around, a temperature set point. Alternatively, the coolant system controller 40 could adjust the speed of the coolant pump 35, move a baffle controlling the flow of air to the radiator 34, alter the flow of another fluid through a heat exchanger or otherwise adjust the temperature of the coolant or the stack 12.

The module 10 also has a master controller 42. The master controller 42 operates the hydrogen recirculation pump 20, the purge valve 22, the air pump 28 and other balance of plant elements directly or by sending data to controllers associated with those elements. The master controller 42 also supplies the temperature set point to the coolant system controller 40. The master controller comprises a computer, such as a general purpose computer or a programmable logic controller, communication ports, and data storage.

The computer is programmed to implement a control process to keep the humidity in the stack 12 in a desired range. In this process, a signal associated with the recirculation pump 20 is sent to the master controller 42 and considered to determined if the rate of water removal from the stack 12 should be varied. The signal indicates the humidity, or a change in humidity, in the stack by way of a change in the operation of the recirculation pump 20 caused by a corresponding variation in the density of the gasses in the recirculation loop 21. The rate of water removal from the stack 12 can be changed by, for example, changing an anode side purge rate, which may be implemented by opening the purge valve 22 more frequently or for longer periods of time. Alternatively, the rate of water removal can be varied by changing the cathode side gas flow rate, which may be implemented by varying the speed of the air pump 28. As a further alternative, the rate of water removal can be varied by changing the temperature of the stack 12, which is implemented by varying the cooling system temperature set point. As yet a further alternative, two or more of these methods may be used in combination.

Figure 2:
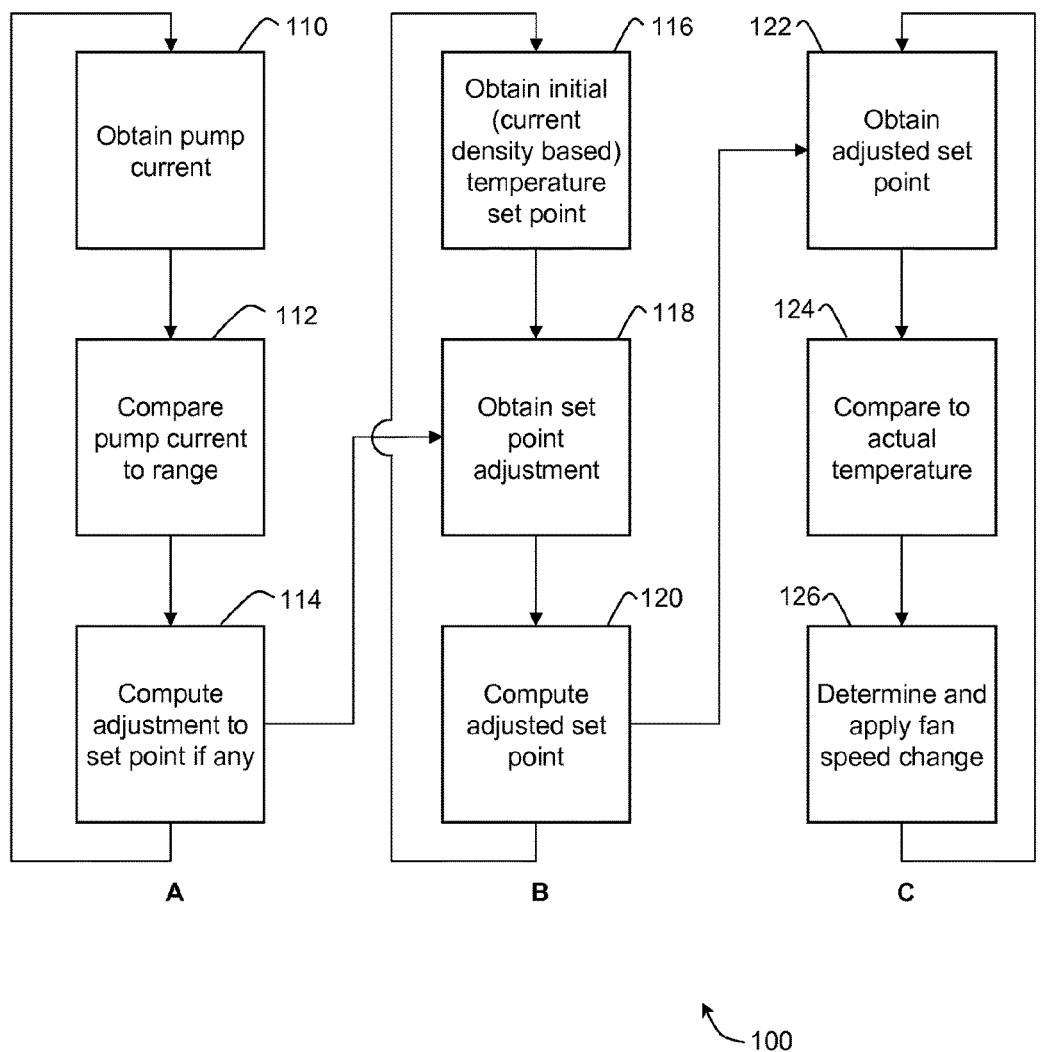
FIG. 2 is a schematic representation of a fuel cell operating procedure.

FIG. 2 shows an example of one control process 100 which can be programmed into the master controller 42, the cooling system controller 40 or both. The control process includes three interactive loops, A, B and C. Loop A is a temperature set point adjustment loop. Loop B is a main temperature setting loop. Loop C is a cooling system controller loop. Other processes in which the recirculation pump is used as a humidity or water content sensor could also be developed.

In column A, in step 110, the master controller 42 obtains a signal indicating the current being drawn by the hydrogen recirculation pump 20. The recirculation pump 20 is a regenerative (centrifugal) high speed pump. The master controller 42, or a pump controller, operates the recirculation pump 20 at a constant voltage or a constant speed. The speed may be, for example, in the range of 18,000 and 24,000 rpm. The density of the gasses in the recirculation loop 21 varies with their humidity. Since it rotates at a constant speed, or at a nearly constant speed because it is supplied with a constant voltage, the recirculation pump 20 consumes more current and energy when the density of the gasses increases. Accordingly, the current (or power) drawn from the recirculation pump 20 indicates the density and humidity of gasses in the stack 12. Alternatively, if the current or power supplied to the recirculation pump 20 is kept constant, variations in the voltage or speed of the pump can be used to indicate the humidity of the stack 12. A combination of signals associated with the recirculation pump 20 might also be used. The combination may also be a ratio, for example of an electrical parameter (such as power, current or voltage) to a mechanical parameter (such as speed, volumetric flow rate or mass flow rate), that varies in response to changes in the density of the gasses in the recirculation loop 21.

In step 112, the sensed current is compared to a specified current range or value. The range or value is chosen to represent a preferred humidity in the stack 12. For example, in one stack 12, a range of between 4.0 and 4.5 A was correlated with maximum cell stack voltages. Optionally, the specific current range or value may vary with another parameter such as stack current density. Alternatively, since the density, vapor partial pressure or relative humidity of the gasses in the recirculation loop 21 may vary with temperature, the specified current range or value may vary with temperature. However, since the density variation with humidity is more pronounced than the density variation with temperature, a fixed current range may be specified.

In step 114, a temperature set point adjustment is calculated. This may be done by a linear mapping of a temperature adjustment range, for example from −5 degrees C. to +5 degrees, to a range in amperage, for example from −4 A to +4 A, above and below the specified range. In this case, a sensed current of 2 A produces a set point adjustment of −2.5 degrees. A sensed current of 6.5 A produces a set point adjustment of +2.5 degrees.

A high sensed current indicates that the gases in the recirculation loop 21 have become denser due to an increase in the membrane water content and humidity in the stack 12. Raising the coolant system temperature set point raises the temperature of the stack 12. The rate of water evaporation and the temperature of air on the cathode side of the stack 12 increase. Warmer air with a higher vapor content is expelled from the air outlet 26, which causes an increase in the rate of water removal from the stack 12.

Referring to loop B, in step 116 the master controller 42 obtains an initial temperature set point. In one example, the coolant temperature set point varies linearly from 55 degrees C. at 0% of the rated current density to 65 degrees C. at 100% of the rated current density of the stack 12. The master controller 42 polls the stack current density and calculates the coolant temperature set point based on this relationship. For example, while the stack 12 is operating at 50% of its rated current density, the initial temperature set point is 60 degrees C.

In step 118, the master controller 42 transfers the temperature set point adjustment determined in loop A into loop B. In step 120, the master controller 42 computes an adjusted temperature set point. This is done by adding the temperature set point value adjustment (which may be negative) derived from loop A to the initial temperature set point derived from step 116. Optionally, loops A and B may be integrated into one loop.

Referring to loop C, in step 122 the cooling system controller 40 obtains the adjusted temperature set point from the master controller 42. Alternatively, the master controller 42 may also control the cooling system, or the cooling system controller 40 may operates loops A and B. In these cases, step 122 may be merely a data transfer between loops B and C. Loops B and C, or loops A, B and C, may be integrated together into one loop.

In steps 124 and 126, the cooling system controller 40 compares the adjusted temperature set point to the actual temperature measured by the temperature sensor 38. The cooling system 40 directs the fan 36 to operate at between 0 to 100% of its maximum speed through a variable frequency drive motor. Adjustments to the fan speed are based on a linear relationship in which the temperature set point correlates with a reference fan speed (for example 50%), a temperature 10 degrees higher correlates with a 100% fan speed, and a temperature 10 degrees lower correlates with a 0% fan speed. For example, if a measured temperature is 5 degrees over the set point, the fan speed may be set at 75% until the next turn of loop C. Optionally, the reference fan speed may be variable. In general, fan speed is increased if measured temperature rises over the set point and decreased if measure temperature is too low. Optionally, a PID type fan speed control loop may be used.

An offset of 1 or 2 degrees between the set point and the measured temperature may be permitted. The humidity control loop (loop A) will adjust the temperature set point as required to produce a desired humidity even if the actual temperature varies from the temperature set point.

The process 100 may also help the module 10 operate despite a failure of one of its components. For example, if the purge valve 22 developed a leak, the humidity would tend to be too low. The master controller 42, sensing a low current in the hydrogen recirculation pump, would reduce the cooling system temperature set point to help maintain adequate humidity until the module 10 can be serviced.

While humidity in the stack might in theory be measured by a humidity sensor, no economical sensor useful in the recirculation loop currently exists. A humidity sensor would also event add an additional part to the stack 12. Cell stack voltage changes over time can also be used to provide information regarding stack humidity. However, a voltage variation is not typically detected until 5 minutes or more after the humidity change occurs. In contrast, a change in recirculation pump 20 current can be sensed within seconds of a change in humidity. It is also difficult to isolate humidity variations from other factors that cause cell stack voltage changes, whereas recirculation pump 20 current variations appear to be dominated by humidity. However, readings of cell voltages against the load current or superimposed currents could be used in combination with recirculation pump signals to provide a combined method.

The invention claimed is:

1. A process for operating a fuel cell stack comprising the steps of,
   a) re-circulating hydrogen through the stack using a pump;
   b) monitoring a parameter responsive to the energy consumed by the pump per unit volumetric flow rate of re-circulating hydrogen; and,
   c) increasing a rate of water removal from the stack if the parameter is above a preferred value or range and decreasing the rate of water removal from the stack if the parameter is below the selected value or range.

2. The process of claim 1 wherein step b) comprises operating the pump at a generally constant voltage or speed over a period of time and the monitored parameter is the current drawn by the pump.

3. The process of claim 2 wherein the pump is a regenerative or centrifugal pump.

4. The process of claim 1 wherein the rate of water removal from the stack is increased or decreased by one or more of: changing an anode side purge rate; changing a cathode side flow rate; and, changing a stack or cooling system temperature.

5. The process of claim 1 wherein step b) comprises sending a signal indicating the parameter to a controller and step c) comprises the controller sending a signal to one or more balance of plant elements associated with the stack.

6. A process for operating a fuel cell stack comprising the steps of,
   a) re-circulating hydrogen through the stack using a pump;
   b) monitoring a parameter responsive to the energy consumed by the pump per unit volumetric flow rate of re-circulating hydrogen; and,
   c) raising the temperature of the stack if the parameter is above a preferred value or range or lowering the temperature of the stack if the parameter is below the preferred value or range.

7. The process of claim 6 wherein step c) comprises changing the speed of a radiator fan associated with a cooling system in which water passes through the stack and a radiator.

8. The process of claim 6 wherein step c) comprises raising or lowering a cooling system temperature set point or range.

9. The process of claim 8 wherein the module comprises a radiator fan associated with a cooling system in which water passes through the stack and a radiator and the process comprises a step of increasing the radiator fan speed if a measured cooling system temperature is above the temperature set point or range and decreasing the radiator fan speed if the measured temperature is below the set point or range.

10. The process of claim 8 wherein step c) comprises a step of mapping the monitored parameter value to a temperature set point adjustment value.

* * * * *